United States Patent Office

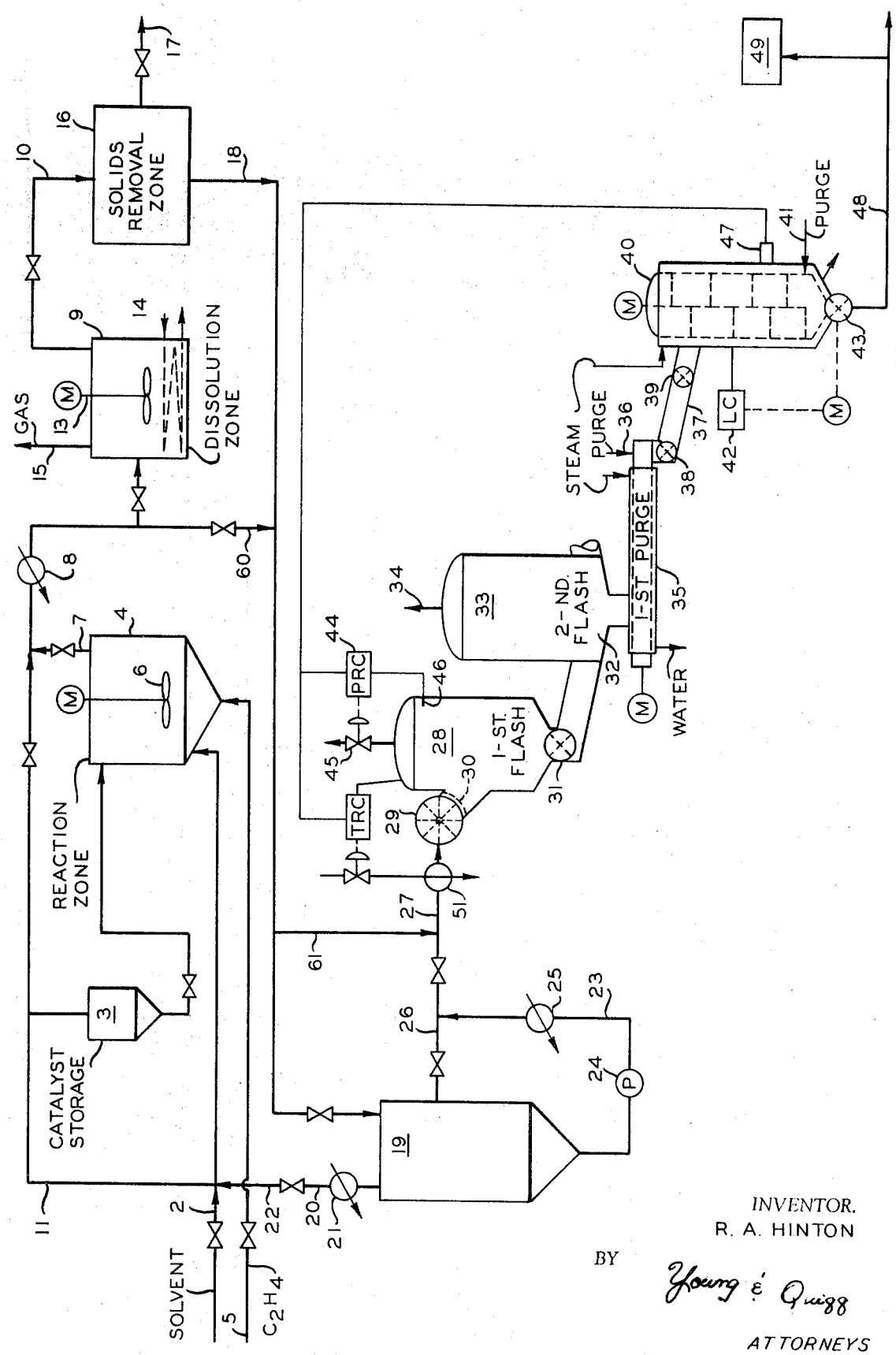

3,594,356
Patented July 20, 1971

3,594,356
POLYMER RECOVERY PROCESS AND APPARATUS
Robert A. Hinton, Bartlesville, Okla., assignor to
Phillips Petroleum Company
Filed Apr. 24, 1967, Ser. No. 633,227
Int. Cl. C08f 1/88, 1/98
U.S. Cl. 260—88.2   10 Claims

ABSTRACT OF THE DISCLOSURE

Bulk density of polymer recovered from a solution thereof in a solvent is controlled by removing the polymer from solvent in a flashing operation wherein the flash zone is held at an elevated pressure, said pressure being sufficiently high to densify the polymer but not so high as to restrict the flashing of solvent from the solution. The initial solvent removal is thus achieved by flashing the solution consisting essentially of polymer and solvent in a flash-comminution zone having a pressure maintained therein in the range of 16 to 50 p.s.i.a., thereafter passing the resulting solid sized polymer particles to a lower pressure solvent removal zone and finally purging the resulting essentially solvent-free material in two or more zones to provide substantially solvent-free polymer. Pressure in the initial flash-comminution zone is controlled responsive to the measured value of the bulk density of the polymer in the purge zone.

---

This invention relates to the production and recovery of normally solid polymer. In one aspect it relates to a process for the recovery of a normally solid polymer having an increased or controlled bulk density from a solution thereof in a solvent. In another aspect it relates to a novel method and apparatus for the production of a substantially solvent-free polymer having an increased and/or controlled bulk density.

Several different processes are known in the art for the production of normally solid polymers, such as polyethylene, polybutadiene and polystyrene. In many of the known processes, the polymer is initially obtained in the form of a solution in the solvent and must be recovered therefrom. Recovery can be effected by different methods, such as solvent vaporization, which leaves the polymer as a nonvolatile residue, and cooling of the solution to cause precipitation of the polymer, which is subsequently recovered by filtration. Vaporization processes for solvent removal are accompanied by difficulty in removing the last traces of solvent from the polymer. This difficulty arises from the fact that as the solution becomes more and more concentrated, its viscosity increases. Heat transfer is correspondingly retarded and, if proper control is not exercised, the polymer may be thermally decomposed as a ressult of unduly high residence times in recovery equipment at high localized temperatures. It is highly desirable to free the polymer from the solvent insofar as completely as possible because small amounts, e.g., a few weight percent, of solvent in the polymer forms bubbles upon extrusion of said polymer and consequently cavities when the polymer is heated preparatory to molding.

In addition to the removal of the solvent it is also desirable that the bulk density of the polymer product be controlled. Polymer having a light bulk density has been found to have a tendency to bridge in the system and ultimately results in the plugging of the polymer storage zone. In addition, a more dense polymer can be handled in smaller equipment. For example, doubling the density makes it possible to decrease drying equipment to one half its usual size. In addition to plugging, polymer having irregular bulk density further presents a problem in maintaining a constant feed rate to the polymer extruder utilized for the further processing of the polymer.

The present invention thus provides a process and apparatus by which polymer having a controlled bulk density can be recovered from a solution thereof by vaporization of the solvent without thermal decomposition of the polymer and the finally recovered polymer contains less than 0.2 weight percent of solvent, often less than 0.02 weight percent, and can be molded or extruded without undue formation of cavities caused by solvent vaporization and without plugging or irregular feed rates to the molding apparatus.

The process of the present invention is effected as follows. In a first stage, a soution of polymer in solvent is flashed in a flash-comminution zone maintained under pressure and below the melting point of the polymer so as to remove a major portion of the solvent and obtain dense solid polymer particles. The flash zone has associated therewith a chopping means wherein the solid concentrate is reduced to a predetermined size. In a second stage the resulting sized polymer particles are treated for additional solvent removal in a solvent removal zone which is operated at a lower pressure than the first stage flash-comminution zone. The resulting polymer is thereafter passed to two purge zones in series wherein it is subjected to countercurrent streams of inert purge gas at a temperature below the melting point of the polymer and substantially all of the remaining solvent is removed from the polymer. The resulting essentially solvent-free polymer is recovered as product.

The melting point of the polymer will vary, depending on the physical and chemical nature and origin of the polymer. Polyethylenes ordinarily range in melting point from about 210 to about 260° F. The polyethylenes prepared by the process of Hogan and Banks, U.S. Pat. 2,825,721, ordinarily have melting points in the range of 240 to 260° F. but can have melting points outside this range.

A special feature of this invention resides in maintaining a pressure on the flash-comminution zone while conducting the flashing of the polymer solution at a temperature below the melting point of the polymer. By maintaining a pressure on the flash-comminution zone there is obtained an apparently "dry" or solid flash residue having an increased bulk density which is readily removed from the flash-comminution apparatus. There is an optimum flash pressure, however, beyond which solvent evaporation is reduced to undesirable levels.

The recovery process of this invention is particularly applicable to the recovery of a polymer produced in a process of the type disclosed and claimed in the aforementioned Hogan and Banks patent, wherein an aliphatic 1-olefin having a maximum chain length of 8 carbon atoms and no branching nearer the double bond than the 4-position is subjected to polymerization conditions in the presence of a catalyst comprising chromium oxide, of which a substantial portion of the chromium is hexavalent, associated with at least one oxide selected from the group consisting of silica, alumina, zirconia and thoria. The chromium (Cr) content of the catalyst is ordinarily a minor proportion, preferably from 0.1 to 10 weight percent. Polymerization is ordinarily conducted at a temperature in the range of 150 to 450° F. The reacted olefin, e.g., ethylene and/or propylene, is often, though not necessarily, subjected to the polymerization conditions in admixture with a hydrocarbon solvent which is inert and can exist as a liquid at the polymerization temperature. Suitable solvents of this class are normally liquid naphthenes, such as cyclopentane, cyclohexane, methylcyclopentane, methylcyclohexane and paraffinic hydrocarbons having from 3 to 12, preferably 5 to 12, carbon atoms per molecule, e.g., normal hexane, isoheptanes, normal octane and 2,2,4-trimethylpentane. The reaction can be conducted as a fixed-bed reaction but is, in many cases, conducted with the catalyst in comminuted form in suspension, as a slurry, in the hydrocarbon solvent. The effluent withdrawn from the reactor comprises a solution of polymer in the solvent, and when a slurry or suspended catalyst is used, the effluent comprises a solution of the polymer in the solvent, suspended catalyst with undissolved polymer adhering thereto, and in many cases, small amounts of unreacted olefin. The unreacted olefin can be removed by venting and/or flashing and the remaining mixture is ordinarily heated to a suitable temperature to effect substantially complete solution of the polymer in the solvent. Additional solvent can be added at this point, if desired, and it is ordinarily the practice to adjust the concentration of polymer in the solution to a value in the range of approximately 2 to approximately 10 weight percent. The solution can be then filtered to remove the suspended catalyst and a solution containing from 2 to 10 weight percent of polymer in the solvent is obtained from which the polymer is recovered. The method of this invention is particularly applicable to the recovery of polymer from such a solution, and particularly to such a solution of a polyethylene. Polymers so recovered are useful for fabrication into pipe, tubing, electrical insulation and water-resistant wrappings, as more fully set forth in the cited patent.

According to one modification of this invention, approximately 25 to 75 percent of the solvent is vaporized in a preliminary concentration zone, from 50 to 99 percent of the remaining solvent is vaporized in the first flash-comminution zone, from 25 to 75 percent of the remaining solvent is removed in the second stage lower pressure solvent removal zone and from 85 to 99.9 percent of the remaining solvent is removed in the final purge zones. Solvent concentration in the product thus obtained from the final purge zone is less than 0.2 weight percent.

In one embodiment of the invention, a preliminary evaporation is conducted at temperatures in the range of 250 to 350° F. and above the melting point of the polymer and the normal boiling point of the solvent, and at a pressure in the range of 0 to 100 p.s.i.g. The thus concentrated polymer solution having a polymer content in the range of 15 to 40 percent is then passed to a first stage flash-comminution zone which is conducted at a temperature in the range of 150 to 250° F. and below the melting point of the polymer and at a positive pressure in the range of 16 to 50 p.s.i.a. The resulting polymer, in the form of a sized fluff, is then passed to a second stage solvent removal flash zone which is operated at a temperature in the range of 150 to 250° F. and below the melting point of the polymer and at a pressure in the range of 15 to 25 p.s.i.a. and preferably at least 5 p.s.i. below that of the first stage flash treating zone. The polymer is thereafter passed to a heated, horizontal polymer purge zone which is operated at a temperature in the range of 150 to 250° F. and below the melting point of the polymer and at a pressure in the range of 15 to 25 p.s.i.a. The polymer is then passed to a second, vertical, purge zone preferably operated under the same conditions of temperature and pressure as the first purge zone. The polymer is agitated in the second purge zone and contacted with an inert gas whereby essentially all of the remaining solvent is removed therefrom. The resulting polymer fluff having a predetermined bulk density can thereafter be stored and/or further treated in conventional apparatus for the formation of filament, pellets or other desired shapes therefrom.

In another embodiment of the invention wherein a high-solids reactor is employed to produce the polymer, the preliminary evaporation step and solids removal step are omitted as the polymer solution obtained from the reactor is already at a relatively high concentration of 15 to 60 percent.

The process of this invention can be conducted in evaporation or vacuum flash tanks, the general construction of which is well known in the art. However, certain special features are involved in the construction of the flash apparatus. It has been found that the bulk density of the polymer formed by flashing can be controlled responsive to the pressure maintained in the flash zone and/or to the temperature of the feed solution passed to the flash zone. Control of pressure and/or temperature and thereby the bulk density of the polymer is provided by novel means as will be described herein.

The solvent vaporized in the steps according to this invention can be condensed, combined and recovered, for example, for recycling to the polymerization reaction. If desired solvent removed from the flash zone after condensing can be returned to the flash zone to assist in maintaining the pressure therein.

Other objects, advantages and features of the invention will be apparent to those skilled in the art from the following description, the drawing and the appended claims.

As shown in the drawing, solvent enters through inlet 2 and is mixed with catalyst supplied from storage zone 3. The catalyst can be, for example, chromium oxide supported on silica gel and prepared as described herein. The catalyst particle size is sufficiently small to facilitate the formation of a slurry of catalyst in the solvent. The catalyst-solvent slurry passes into reaction zone 4. The bulk of the solvent is passed to the reactor through line 2. Ethylene and another olefin such as butene-1 enters the system through inlet 5 and passes into the reaction zone 4 wherein it is mixed with the catalyst and the solvent at a temperature of approximately 280° F. The solvent can be cyclohexane, octane, or other suitable solvents. The proportions of solvent and ethylene are so adjusted that the concentration of polymer in the reaction does not exceed approximately 15 percent and preferably is in the range from 5 to 10 weight percent. However, when a high-solids reactor is employed as described hereafter, the polymer concentration is generally about 20 to 40 weight percent but may be 15 to 60 percent. The pressure in the reaction zone 4 is sufficient to maintain the solvent substantially in the liquid phase and can be, for example, 500 p.s.i.a. The reaction mixture is maintained in a state of turbulence so that the catalyst is maintained in a substantially uniform suspension or slurry in the reaction mixture. This turbulence can be obtained by jet action of incoming monomer through inlet 5 and/or by the use of a mechanical stirrer indicated by the numeral 6 and driven by motor M. The reaction zone effluent which comprises a mixture of polymer, solvent, and suspended catalyst, together with small amounts of unreacted and/or inert gas, is passed through conduit 7 and heater 8 to dissolution zone 9. Additional solvent can be added, if desired, in order to adjust the concentration to a suitably low value, previously stated, so that the viscosity is not too high for efficient catalyst removal. In dissolution zone 9, the mixture is maintained in a state of turbulence as, for example, by means of a mechanical stirrer 13 driven by a motor M and the temperature is maintained, for example, by the use of heater 14, at from 300 to 400° F., i.e., somewhat higher than that utilized in reaction zone 4. The pressure is sufficient to maintain the solvent substantially in the liquid phase but is preferably lower than that in reaction zone 4 to facilitate the evolution of dissolved gas, including unreacted ethylene, which is vented through outlet 15. Heater 14 is of any suitable design known in the art; for example, it can be a steam coil or an electric immersion heater. Effluent from dissolution zone 9 passes through conduit 10 to solids removal zone 16. The material passed through conduit 10 is a homogeneous solution of substantially all of the polymer in the solvent, which solution contains suspended solid catalyst. Solids removal zone 16 comprises any suitable equipment or combination thereof known in the art for the removal of suspended solids from liquids. For example, it can be a filter or a centrifuge or both. It should be suitable for operation under pressure in order to maintain the solvent in the liquid phase during the filtration. (Catalyst removed is withdrawn from the system through conduit 17.) The withdrawn catalyst can be regenerated or reactivated, if desired, and recycled to catalyst storage zone 3 by means not shown in the drawing. The solution which has been freed of suspended catalyst solids is passed through conduit 18 to preliminary evaporation zone 19 which is ordinarily in the form of a flash evaporation tank and is operated, for example, at a temperature of 290° F. and a pressure of 33 p.s.i.g. Approximately half of the solvent is evaporated in zone 19, and the evaporated solvent is passed through conduit 20 and condenser 21. The condensed solvent is then returned through conduits 22 and 2. The concentrated residue from evaporation zone 19 is passed through conduit 23, pump 24 and heat exchanger 25 wherein the temperature is raised for example to 310° F. Part of the solution is returned through conduit 26 to evaporation zone 19. This mode of operation allows outside heating of the unvaporized material from evaporation zone 19 and is a preferred method of supplying heat to said zone, since it is ordinarily impractical to supply heat efficiently directly to the interior of zone 19.

The remainder of the unvaporized material is passed through conduit 27 to flash comminution zone 28 which is operated, for example, at a temperature of 150 to 250° F. but below the melting point of the polymer and at a pressure of 16 to 50 p.s.i.a. The solution entering flash-comminution zone 28 has a concentration, for example, of 15 to 40 weight percent of polymer in solvent. Flash-comminution zone 28 has therein a knife carrying member 29 with three or more arms, each of which carried a knife blade. Screen 30 is provided of appropriate size openings to retain the solid polymer in zone 28 until the desired polymer particle size as determined by the size of the screen openings is obtained by means of the chopper.

The sized solid polymer particles are then passed by means of rotary valve 31 into a second stage solvent removal zone 32 which is maintained at a temperature in the range of 150 to 250° F. below the melting point of the polymer and at a lower pressure than that of zone 28 and generally in the range of 15 to 25 p.s.i.a. Disengaging tank 33 is provided in association with the solvent removal zone 32 and serves to permit liberation of the vapors through overhead line 34 without entraining any of the polymer. Generally from 25 to 75 percent of the remaining solvent is removed from the polymer fluff in zone 32.

The resulting sized, essentially solvent-free polymer material is thereafter passed to a first heated purge zone 35. Inert gas such as nitrogen or ethylene monomer is introduced through line 36 into the zone 35 so as to assist in removing additional solvent from the polymer particles. After purging in zone 35, the polymer particles are passed through a conduit 37 containing rotating valves 38 and 39 and then into a jacketed vertical, stirred purge column 40. In this column the polymer is again treated countercurrently with an inert purge gas, introduced via line 41, such as nitrogen or superheated steam for substantially complete removal of residual solvent. Purpose of valves 38 and 39 is to prevent intermixing of the different purge gases used in purge zones 35 and 40. The level within zone 40 is controlled by level controller 41 which is operatively connected to motor 42 and discharge valve 43 and thereby regulates the rate of removal of polymer from the second stage purge zone 40.

In another embodiment, the density of the polymer particles discharged through valve 43 is controlled by manipulating the pressure in flash zone 28 by means of controller 44 which controls said pressure by manipulating valve 45 in response to pressure sensing element 46, the set point of said controller 44 in turn manipulated by density measuring means 47. Alternatively, density measuring device 47 provides a signal which may manipulate the set point of controller 50 which in turn controls the temperature of feed solution in line 27 by manipulating the flow of heating medium through exchanger 51. Level sensing means 42 and density measuring means 47 may be a radiation-type gauge such as an Ohmart gamma-ray density detection device.

The material from purge zone 40 is thereafter recovered as substantially solvent free polymer fluff having a predetermined bulk density and passed by means of conduit 48 to polymer storage zone 49 or directly to other processing apparatus not shown for further handling. For example, the polymer fluff can be introduced into a conventional polymer extruder wherein it is converted to strands of polymer which are thereafter cut to form pellets, rods, or the like.

While the invention has been described with a single first flash-comminution chamber 28 in association with said second flash chamber, it is within the scope of the present invention to utilize more than one such flash comminution zone in association with the second flash zone.

The following example is presented to more fully describe the invention, but it is not intended that it should be construed as limiting the invention thereto.

EXAMPLE

Ethylene is fed into the reactor at the rate of about 1700 pounds per hour, together with 81.50 pounds per hour of butene-1, both at a temperature of about 100° F. Activated catalyst consisting essentially of chromium oxide deposited on silica is admixed with a small amount of n-hexane and the resulting catalyst slurry is fed to the reactor at the rate of 0.30 pound of catalyst per hour. N-hexane solvent is fed to the reactor at the rate of 4600 lb./hr. By means of circulating the cooling water through the jacket of the reactor, the temperature is maintained at about 280° F. and the reactor pressure is controlled at about 465 p.s.i.a.

The effluent solution of polymer, containing about 22 weight percent polymer, is heated to about 310° F. and fed directly to a chopper directly connected with a first flash tank, both operated at a pressure of 35 p.s.i.a. and a temperature of 230° F. The sized polymeric material from the first flash zone is then passed to a second solvent removal zone which is maintained at a pressure of 18 p.s.i.a. and a temperature of 230° F. The resulting polymer having a bulk density of least 8 lb./ft.$^3$ is thereafter passed to a purge zone consisting of a heated conveyor dryer wherein it is countercurrently contacted with gaseous ethylene for removal of additional solvent. After purging with ethylene the solid polymer particles are passed through two lock valves into a vertical purge column containing a stirring device. The vertical column operates at 230° F. and 18 p,s,i,a, and has 240° F. steam (must be superheated to prevent condensation) or nitrogen passing upward through the column countercurernt to the descending polymer—this additional purging reduces the residual solvent to a negligible concentration. Purpose of the lock valves, previously mentioned, is to prevent mixing of the different purge gases used in the auger-conveyor purge unit and the vertical stirred purge unit. The polymer passes from the stirred unit to storage, thence to conventional extrusion, and to sales.

Although the process of this invention has been described in connection with particular polyethylene processes, it is clearly not limited thereot but is also applicable to the recovery of any normally solid thermoplastic polymer from a solution thereof in a solvent. Thus, the process is also applicable to solutions of polybutadienes, especially hydrogenated polybutadienes as described in U.S. Pat. No. 2,864,809 by Jones and Moberly, polystyrenes, polypropylenes, polyisobutylenes, and polyethylenes produced by processes other than that of the type described heerin, as well as the recovery of halogenated polyethylenes. Also, the process is not limited to the recovery of polymers from saturated hydrocarbon solvents but is applicable wherein solvents such as chloroform, carbon tetrachloride, carbon disulfide and aromatic hydrocarbons and derivatives thereof are used as solvents. The essence of this invention is that a normally solid thermplastic polymer can be recovered substantially free from solvent by a process which comprises evaporating a substantial portion of the solvent at a temperature below the melting point of the polymer while simultaneously chopping or comminuting same, agitating the polymer at a temperature above its melting point to vaporize the remaining solvent, and recovering a substantially solvent-free polymer.

Reasonable variations and modifications of this invention can be made or followed, in view of the foregoing, without departing from the spirit or scope thereof.

I claim:

1. A process for recovering a normally solid thermoplastic polymer from a solution thereof in a solvent which process comprises flashing a solution of said normally solid thermoplastic polymer thereby removing a substantial portion of said polymer from said solution while comminuting the solid polymer as removed in a first flash zone maintained under positive pressure in the range of 16 to 50 p.s.i.a. and at a temperature below the melting point of said thermoplastic polymer, thereafter flashing the resulting mixture of sized solid polymer and solvent in a second flash zone maintained at a temperature below the melting point of said thermoplastic polymer and at a pressure below that of said first flash zone, thereafter introducing the resulting flashed and sized solid polymer to a first purge zone where the polymer is heated and countercurrently contacted with a first purge medium to remove additional solvent therefrom and thereafter introducing the resulting solid polymer to a second purge zone wherein substantially all of the remaining solvent traces are removed from the polymer by contacting same with an inert purge gas and thereafter recovering the solid polymer substantially free of solvent as a product of the process.

2. A process according to claim 1 wherein said polymer is a normally solid polymer obtained by polymerizing at least one 1-olefin having 2 to 8 carbon atoms.

3. A process according to claim 1 wherein the purge to said second purge zone is selected from the group consisting of steam and nitrogen.

4. A process according to claim 1 wherein the bulk density of the polymer obtained as a product of the process is controlled by regulating the pressure in said first flash zone whereby an increase in said pressure results in an increase in the bulk density of the polymer and decrease in the pressure results in a decrease in the bulk density of the polymer.

5. A process according to claim 1 wherein the first flash zone is operated at a temperature in the range of 150 to 250° F.; the second flash zone is operated at a temperature in the range of 150 to 250° F. and at a pressure at least 5 p.s.i.a. below the pressure of said first flash zone; said first purge zone is operated at a temperature in the range of 150 to 250° F. and at a pressure in the range of 15 to 25 p.s.i.a.; and said second purge zone is operated at a temperature in the range of 150 to 250° F. and at a pressure in the range of 15 to 25 p.s.i.a.

6. A process according to claim 1 wherein the bulk density of said polymer obtained as a product of the process is controlled by regulating the temperature of said polymer solution to said first flash comminution zone whereby an increase in solution temperature gives an increased bulk density and conversely a decrease in said temperature gives a decrease in the bulk density of said polymer product.

7. A process according to claim 1 wherein a solution containing about 22 weight percent of a copolymer of ethylene and butene-1 in n-heptane is introduced to said first flash zone which is at a temperature of 230° F. and a pressure of 35 p.s.i.a., the resulting sized solid polymer is thereafter passed to said second flash zone maintained at a temperature of 230° F. and a pressure of 18 p.s.i.a. and the resulting polymer having a bulk density of at least 8 lb./ft.$^3$ is thereafter purged of remaining solvent in said first and second purge zones.

8. An apparatus for recovering a normally solid thermoplastic polymer from a solution thereof which comprises in combination:
first pressured flash chamber having first conduit means in communication with a source of polymer solution and adapted thereto to introduce said polymer solution and having a screen member disposed therein;
second pressured flash chamber in operable association with said first flash chamber to receive polymer from said first flash chamber and adapted to operate at a pressure below that of said first flash chamber;
first valve means between said first and second flash chambers to regulate the flow of solid polymer from said first chamber to said second chamber;
chopping means disposed in said first flash zone and in association with said screen member and said first conduit means, said screen member being so adapted as to retain chopped polymer in contact with said chopping means until the solids have been sized through same;
first horizontally disposed purge chamber in operable association with said second flash chamber to receive polymer from said second flash chamber;
second conduit means in communication with a source of purge medium and said first purge chamber to introduce purge medium thereto;
second purge chamber, vertically disposed and in operable association with said first purge chamber to receive polymer therefrom;
third conduit means connecting said first and second purge zones and having disposed therein second and third valve means, said valve means being so adapted as to preclude the intermixing of purge medium employed in each of said first and second purge chambers;
fourth conduit means in communication with a source of purge medium and the lower end of said second purge chamber and adapted to introduce purge medium to said second purge chamber;
fourth valve means in the lower end of said second purge chamber adapted to regulate the solids level within said second purge chamber; and
agitator means disposed in said second purge chamber to agitate the polymer therein while being contacted with said purge medium.

9. An apparatus according to claim 8 wherein the pressure in said first pressured flash chamber is regulated responsive to a signal representative of the value of the bulk density of the polymer treated in said second purge chamber.

10. Apparatus according to claim 8 wherein a heat means is provided in said first conduit means and the temperature of polymer solution in said first conduit means is regulated responsive to a signal representative of the value of the bulk density of the polymer treated in said second purge chamber.

References Cited

UNITED STATES PATENTS

| | | | |
|---|---|---|---|
| 3,201,365 | 8/1965 | Charlesworth et al. | 260—34.2 |
| 3,245,967 | 4/1966 | Moon et al. | 260—88.2 |
| 3,272,789 | 9/1966 | Joyner et al. | 260—93.7 |
| 2,964,513 | 12/1960 | Dale | 260—94.9 |
| 3,457,248 | 7/1969 | Cunningham et al. | 260—93.5 |

JOSEPH L. SCHOFER, Primary Examiner

S. M. LEVIN, Assistant Examiner

U.S. Cl. X.R.

260—93.5, 93.7, 94.2, 94.9; 23—263